Oct. 28, 1969  E. W. JARVIS ET AL  3,474,842
SLICER
Filed May 29, 1967  2 Sheets-Sheet 1
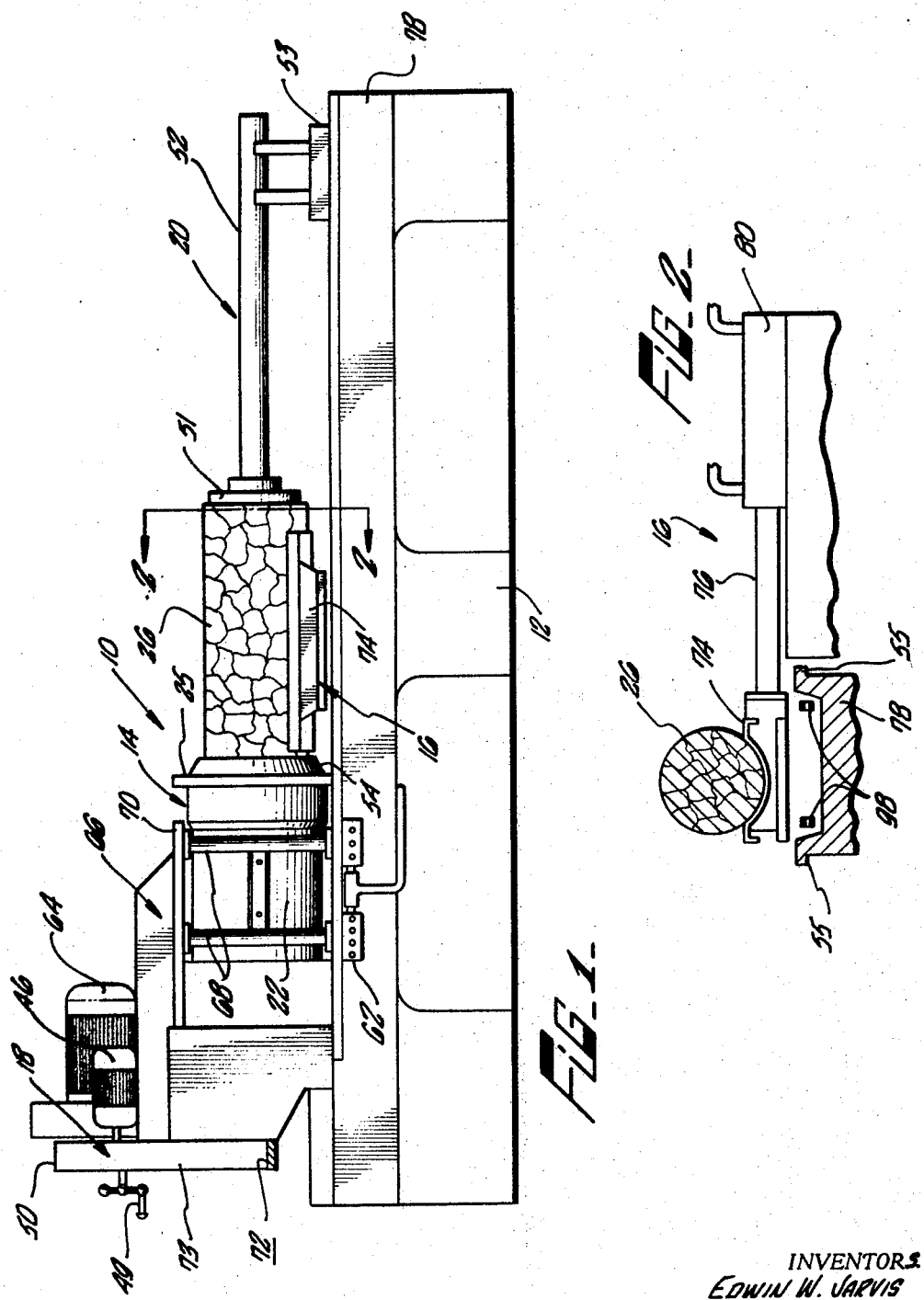
INVENTORS
EDWIN W. JARVIS
DAHL B. CASEY
BY
Christie, Parker & Hale
ATTORNEYS

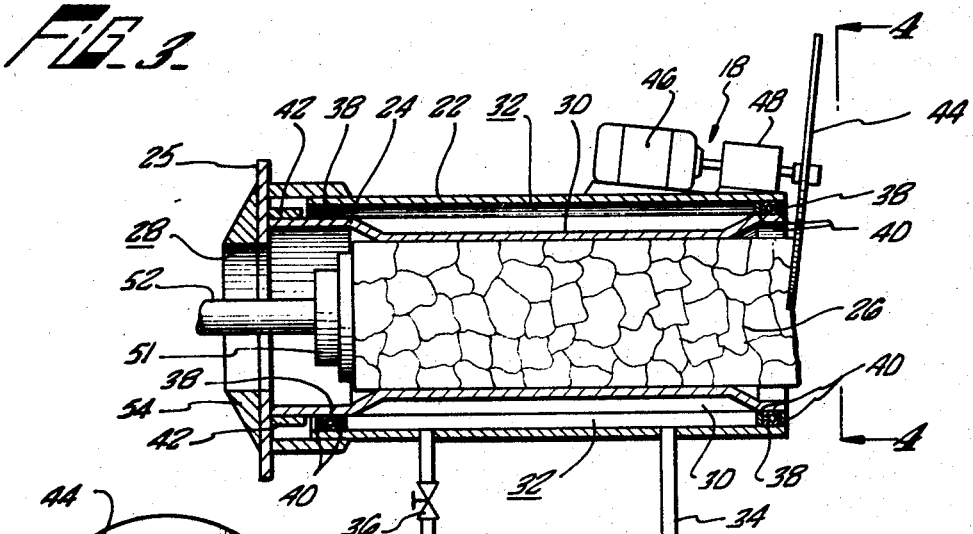
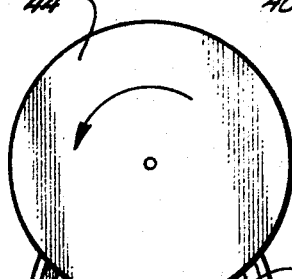
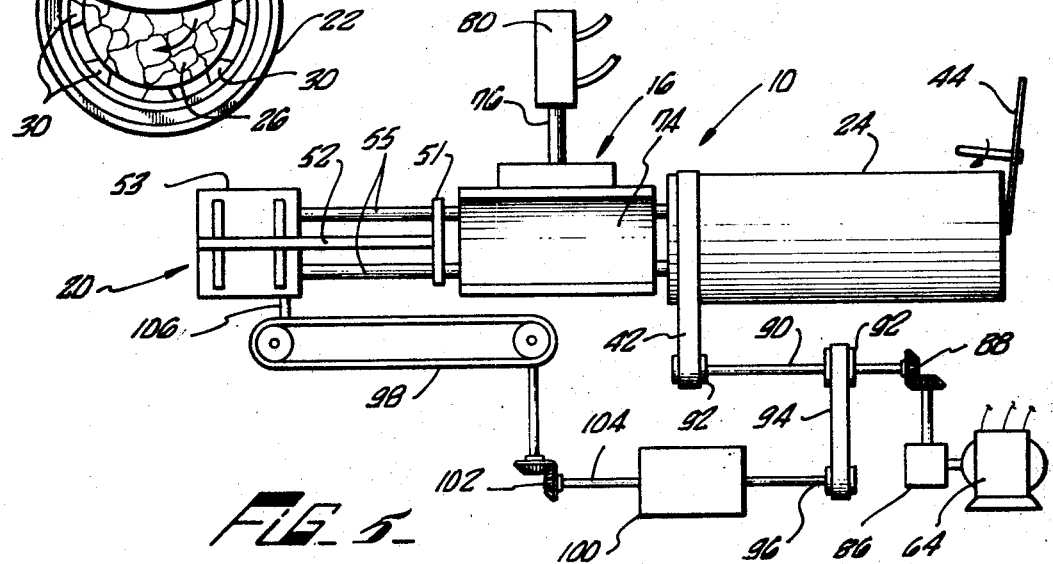
INVENTORS.
EDWIN W. JARVIS
DAHL B. CASEY
BY
Christie, Parker & Hale
ATTORNEYS United States Patent Office 3,474,842
Patented Oct. 28, 1969

3,474,842
SLICER
Edwin W. Jarvis, Los Angeles, and Dahl B. Casey, La Palma, Calif., assignors to Kold Kist, Inc., Los Angeles, Calif., a corporation of California
Filed May 29, 1967, Ser. No. 642,070
Int. Cl. B26d *4/36, 4/78*
U.S. Cl. 146—106                                17 Claims

ABSTRACT OF THE DISCLOSURE

A meat slicer, which produces thin, continuous strips of frozen meat from a frozen preform, has a rotatable drum mounted in a fixed housing for receiving the frozen preform from a preform support. A ram engages the preform on the support, inserts it in the drum and advances it through the drum. A circular cutting disc, which rotates in the opposite direction from the drum, cuts a continuous slice of meat from the preform as it exits from the drum. The preform's advance through the drum is a function of the drum's rotation rate because the drum and ram drives are coupled. An annular chamber is provided between the outside of the drum and the housing through which refrigerant is circulated to maintain the preform in its frozen state.

Background of the invention

This invention relates to the art of meat processing and, more particularly, to an apparatus for cutting thin slices of meat from a frozen preform.

Preformed meat is used in the production of packaged meat. Preforms are generally cylindrical in shape and consist of meat chunks which are compressed together in a frozen state. The product produced from the preform is generaly frozen and consists of a consolidation of several meat slices.

It is desirable in any marketed meat to offer the consumer a tender and juicy product at a reasonable price. The sliced product produced from preforms should, as well, maintain its original packaged integrity after thaw, during cooking and at the consumer's table. Tenderness is enhanced by fabricating the product from thin slices. Thin slices also lower consumer cost, for the thinner the constituent slices, the lower the quality meat needed to produce a given amount of tenderness.

Conventional meat slicing equipment for generating slices of meat from a preform includes a receptacle for receiving a preform and an advancing mechanism for pushing the preform into the path of a rotating knife. This type of apparatus is shown in U.S. Patent No. 2,255,796 to Linane et al. The problems encountered with conventional devices is in obtaining thin slices in continuous form and in retaining the meat's juices. As individual slice thickness is reduced to tenderize the product, the length of the slice decreases compromising the marketed, consolidated product's integrity during thawing and cooking. In addition, a considerable amount of the natural meat juices are lost during the prior art slicing operation with a corresponding loss in customer appeal.

Summary of the invention

The meat slicing apparatus of the present invention provides very thin, long strips of meat from a preform which retain substantially all of their juices because the preform is maintained in a frozen state during the slicing.

In one form, the meat slicing apparatus of the present invention includes a drum which is mounted on a base. The drum has an interior adapted to receive the frozen preform of meat. Means are provided, such as a ram, for inserting and advancing the preform in and through the drum's interior. The advancing preform encounters cutting means at the exit of drum which slices the preform into thin and relatively continuous strips for subsequent processing. Means are also provided for refrigerating the preform to maintain it in its frozen state during its residence in the drum's interior. It has been found that by maintaining the preform in a frozen state during the thin slicing process very thin and relatively continuous slices can be produced while retaining the meat's juices.

Preferred forms of the apparatus include a housing for rotatably supporting the drum with the refrigerating means including a chamber or cavity disposed annularly between the housing and the drum and provision for introducing and circulating the refrigerant through the chamber. Protruding ribs are preferably provided on the inner wall of the drum; the ribs are spaced apart and extend parallel to the drum's longitudinal axis to support the preform for rotation as it is advanced through the drum while minimizing the drag between the preform and the drum.

The preferred cutting means includes a disc disposed at the exit end of the drum and in counterrotating relationship with respect to thed rum. The disc is capable of cutting at least to the longitudinal axis of the preform and is canted slightly towards the line of advance of the preform in order to initiate a cut.

Another aspect of the invention contemplates coupling the preform advancing mechanism with the rotation rate of the drum to insure constant meat slice thickness regardless of variable cutting resistance produced by the heterogeneous, constituent chunks of the preform. This is accomplished by coupling the drum's drive with the preform ram drive such that the rate of preform travel through the drum is directly proportional to drum rotation. In order to suit the requirements of various meat packaging operations, such slicing variables as advance rate, drum rotation rate and cutting disc rotation are preferably variable with the drum rotation and ram advance still dependent on each other. Variation in these rates may be accomplished by variable speed transmissions in their respective drives.

In one form, the ram is mounted for translational travel toward and away from the drum on ways. The preform is initially supported at the mouth of the drum on a cradle intermediate the drum and the ram. In order to avoid interference by the cradle with ram advance towards the drum, means are provided such as a retraction assembly to withdraw the cradle from its supporting position over the ways.

The meat slicing apparatus of the present invention has many advantages over prior art slices. By refrigerating the preform to maintain it frozen during the slicing operation, relatively long thin slices can be produced without the loss of any appreciable amount of meat juices. The coupling of the inserting and advancing means with the drum rotating means insures that slice thickness does not vary with cutting conditions. Slice thickness can be adjusted through a variable speed transmission in the drive chain of the drum and ram without departing from thickness uniformity. Drag is reduced between the translating preform in the drum and the drum itself by the longitudinal ribs; the ribs also enhance the preform's refrigeration because of dead air space between adjacent ribs.

These and other features, aspects and advantages of the present invention will become more apparent from the following description, appended claims and drawings.

Brief description of the figures

FIGURE 1 is an elevational view of a preferred meat slicer according to the present invention;

FIGURE 2 is an end view taken along line 2—2 of FIGURE 1;

FIGURE 3 is an elevational view, in half section, of the preferred drum and housing assemblies of FIGURE 1;

FIGURE 4 is an end view of the structure shown in FIGURE 3 taken along line 4—4; and FIGURE 5 is a mechanical, schematic, plan view of the apparatus shown in FIGURE 1.

Description of the preferred embodiments

In general, and with reference to FIGURES 1 and 5, meat slicing apparatus 10 includes base 12 upon which is mounted drum assembly 14, preform support assembly 16, cutting assembly 18 and ram assembly 20.

Drum assembly 14 is best illustrated in FIGURE 3. Cylindrical housing 22 contains rotatable drum 24. The housing is fixed to base 10 through support plate 25 at one end and through other support means (not shown) at its other end. Drum 24 is adapted to receive and hold preform 26 for rotation with the drum through mouth 28 of housing 22. For this purpose, longitudinal, inwardly extending ribs 30 are formed in the wall of drum 24 to grip the preform. These ribs are spaced apart from each other, as is shown in FIGURE 4, and present small area preform contacting surfaces which reduce drag between the preform and the drum during preform advance through the drum. Annular refrigerant chamber 32 is disposed between the inner wall of housing 22 and the outer wall of drum 24 to contain a refrigerant which maintains preform 26 frozen as it travels through drum 24. Refrigerant is introduced into and withdrawn from chamber 32 through conduits 34 from the schematically depicted refrigeration system. Control of the refrigerant circulation rate is provided by valve 36. Drum 24 is supported in housing 22 in bearings 38. Seals 40 prevent the escape of refrigerant from chamber 32. Drum 24 is driven in rotation by drive belt 42 disposed about a portion of the outer peripheral surface of the drum adjacent plate 25.

Cutting disc assembly 18 is mounted on housing 22 and includes circular cutting disc 44, drive motor 46 and variable speed transmission 48. Drive motor 46 is coupled through transmission 48 to disc 44. The cutting disc is disposed at a slight inward angle from a normal to the longitudinal axis of the drum's interior. The angle enables disc 44 to initiate a cut in preform 26. Crank 49 is operable to adjust this angle of repose of disc 44 with respect to preform 26. Shroud 50 is disposed about disc 44 for operator safety. Drum 24 is rotated clockwise while disc 44 is rotated counterclockwise to establish a counterrotating cutting action which accelerates the rate of cut. Controls 62 are shown schematically for completeness.

Ram assembly 20 includes pusher plate or head 51, support shaft 52 and ram carriage 53. Pusher plate or head 51 of ram assembly 20 is shown urging preform 26 into cutting disc 44. The diameter of head 51 is, of course, smaller than the minimum diametrical interior dimension of drum 24. Head 51 is rotatably mounted on and advanced by shaft 52. Carriage 53 supports shaft 52 and head 51 above ways or guides 55.

Mouth 28 or housing 12 is defined by annular lip 54 and a concentric opening in support plate 25. The mouth opens into the interior of drum 24.

Drum and ram drive motor 64 is mounted on superstructure 66 and drives belt 42 for rotation of drum 24 in housing 22. The superstructure includes uprights 68 which support platform 70. Platform 70 supports disc drive motor 46, as well as drum and ram drive motor 64. Sliced meat exits from the slicer 10 from opening 72 in guard 73 where it is collected for subsequent processing. Guard 73 is mounted on and forms a part of superstructure 66.

FIGURE 2 illustrates the preferred mode of supporting preform 26 prior to its entrance into drum 24. Cradle 74 is configured to firmly suport preform 26. In the embodiment shown, preform 26 is cylindrical; thus the supporting surface of cradle 74 is also circular. Cradle 74 is held by shaft 76 above bed 78 of base 12. Cradle retracting assembly 80 is operable to act on cradle shaft 76 to retract the cradle from its initial position over bed 78 in order that ram carriage 53 can translate on ways 55 for the advance of preform 26 in drum 24. The retracting assembly may be operated pneumatically or hydraulically.

FIGURE 5 schematically depicts the entire apparatus. Drum and ram drive 64 in the form of an electric motor drives variable speed transmission 86. Transmission 86 through bevel gears 88 is coupled to shaft 90 for the latter's rotation. Shaft 90 through pulleys 92 drives belt 42 and belt 94. Belt 42 is disposed about outer peripheral surface of drum 24 for driving the latter in rotation. Belt 94 drives shaft 96 and endless chain 98 through variable speed transmission 100. Bevel gears 102 provide the coupling of shaft 104 with drive chain 98. Drive chain 98 is mechanically coupled to ram carriage 53 by drive pawl 106. Carriage 53 is carried on ways 55 coaxially with the longitudinal axis of drum 24. Pusher plate or head 51 is rotatably mounted on shaft 52 which in turn is carried by ram carriage 53. Cradle 74 is cantilevered by shaft 76 over ways 55. Shaft 76 is operable to withdraw cradle 74 from over ways 55 towards retracting assembly 80. Retracting assembly 80 provides this lateral positioning facility. Rotating disc cutter 44 is disposed to cut thin, helical strips of frozen meat from an advancing preform exiting from drum 24.

The ram drive train and drum drive train are both driven from drum and ram drive 64 and therefore are operatively coupled together. Because of this coupling, the rate of preform advance through drum 24 is directly proportional to the rate of drum rotation assuring constant thickness of sliced meat. Variable speed transmission 100, however, allows an adjustment of the rate of translation of ram carriage 53 with respect to the rate of rotation of drum 24 for varying of slice thickness.

The operation of meat slicer 10 will now be described with particular reference to FIGURE 5. A frozen cylindrical preform is placed on cradle 74 with the cradle over ways 55 in position for pusher plate or head 51 to engage, insert and advance the preform into and through drum 24. Drum and ram drive 64 is energized to rotate drum 24 and energize ram assembly 20 for the advancement of the preform through the drum. As head 51 moves toward the entrance of drum 24, it engages the preform and inserts the latter into the drum. After a prescribed amount of travel of ram assembly 20 towards drum 24, retracting assembly 80 withdraws cradle 74 away from ways 55 and towards itself to make room for the continued travel of ram carriage 53. The amount of advance necessary to actuate retracting assembly 80 will be determined by the placement of the preform in drum 24. Actuation of retracting assembly 80 is conveniently accomplished through a limit switch operated by the ram carriage when it reaches the desired amount of advance. Once the preform is within the drum 24, ribs 30 shown in FIGURE 3 engage the preform for its rotation with the drum. As the drum rotates, the head continues to advance the preform through the drum into cutting disc 44. With continued advance, the preform encounters rotating cutting disc 44 which cuts the preform into thin slices for subsequent processing. Refrigerant is circulated in chamber 32 during the preform's course through drum 24 to maintain the preform frozen during its slicing by disc 44. The slicing of the preform while it remains frozen retains meat juices, enables thin slicing and produces relatively long strips of meat. A new cycle is initiated by retracting the ram assembly back to the position shown in FIGURES 1 and 5 and the placement of the preform carriage 74 over ways 55.

The present invention has been described with reference to certain preferred embodiments. It will be understood by those skilled in the art, however, that the spirit and scope of the appended claims should not necessarily be limited to the foregoing description.

What is claimed is:

1. Apparatus for producing thin strips of frozen meat from a frozen preform comprising:
    (a) a base;
    (b) a drum on the base having an interior adapted to receive and discharge the preform;
    (c) means for inserting and advancing the preform in and through the interior of the drum to a discharge end of the drum;
    (d) means for refrigerating the preform to maintain its frozen state in the drum;
    (e) means for rotating the drum and the preform about the longitudinal axis of the interior of the drum during operation of the preform advancing means; and
    (f) a cutting edge disposed in cooperation with the discharge end of the drum to continuously cut the preform at least to the axis of rotation of the advancing preform.

2. Apparatus for producing thin strips of frozen meat from a frozen preform comprising:
    (a) a base;
    (b) a drum on the base having an interior adapted to receive and discharge the preform;
    (c) means for inserting and advancing the preform in and through the interior of the drum to a discharge end of the drum;
    (d) means for refrigerating the preform to maintain its frozen state in the drum;
    (e) means for rotating the drum and the preform about the longitudinal axis of the interior of the drum during operation of the preform advancing means, the inserting and advancing means being coupled with the drum rotating means such that the rate of preform advance is directly proportional to the rate of drum rotation; and
    (f) means for cutting the advancing preform into thin strips as it exits from the drum.

3. The apparatus claimed in claim 1 including a housing mounted on the base, the drum being rotatably received in the housing.

4. The apparatus claimed in claim 3 wherein the refrigerating means includes:
    (a) a chamber between the housing and the drum; and
    (b) means for circulating refrigerant in the chamber.

5. The apparatus claimed in claim 4 wherein the chamber is annularly disposed about the drum and extends substantially the length of the drum.

6. The apparatus claimed in claim 5 wherein the drum includes a plurality of spaced-apart, longitudinal ribs extending into the drum's interior, the ribs being adapted to receive the frozen preform and hold it for rotation with the drum.

7. Apparatus for producing thin strips of frozen meat from a frozen preform comprising:
    (a) a base;
    (b) a drum on the base having an interior adapted to receive and discharge the preform;
    (c) means for inserting and advancing the preform in and through the interior of the drum to a discharge end of the drum;
    (d) means for refrigerating the preform to maintain its frozen state in the drum;
    (e) means for rotating the drum about its longitudinal axis and the preform disposed therein during operation of the preform advancing means; and
    (f) a cutting disc rotatable about an axis substantially stationary relative to the base and disposed in cooperation with the discharge end of the drum to continuously cut the preform at least to the axis of rotation of the advancing preform.

8. The apparatus claimed in claim 2 wherein the cutting means includes a cutting disc disposed with respect to the longitudinal axis of the drum's interior to continuously cut cut at least to the axis of the advancing preform.

9. The apparatus claimed in claim 8 including a housing mounted on the base, the drum being rotatably received in the housing; and wherein the refrigerating means includes:
    (a) a chamber between the housing and the drum; and
    (b) means for circulating refrigerant in the chamber.

10. The apparatus claimed in claim 9 wherein:
    (a) the chamber is annularly disposed about the drum and extends substantially the length of the drum; and
    (b) the drum includes a plurality of spaced-apart, longitudinal ribs extending into the drum's interior, the ribs being adapted to receive the frozen preform and hold it for rotation with the drum.

11. The apparatus claimed in claim 10 wherein:
    (a) the cutting disc is disposed at a slight angle to a plane perpendicular to the longitudinal axis to the drum's interior with the disc canted towards the advancing preform; and
    (b) the cutting means is operable to rotate the disc in the opposite direction from rotational direction of the drum.

12. The apparatus claimed in claim 11 including means for supporting the frozen preform before its insertion into the drum's interior and means for varying strip thickness.

13. An apparatus for producing thin strips of frozen meat from a frozen preform comprising:
    (a) a base;
    (b) a housing on the base;
    (c) a drum rotatably received in the housing having an interior open at two ends, the interior being adapted to receive the preform;
    (d) a preform support on the base proximate one of the open ends of the drum for holding the preform prior to its insertion into the drum's interior;
    (e) a ram on the base operable to remove the preform from the support, insert the preform into the interior of the drum and advance the preform through the drum's interior;
    (f) means for rotating the drum operatively coupled to the ram such that the rate of preform advance through the drum's interior is directly proportional to the rate of the drum's rotation;
    (g) a cutting disc at the other open end disposed to cut at least to the longitudinal axis of the preform;
    (h) means for rotating the disc in the opposite direction from the drum's rotation; and
    (i) refrigerating means operable to cool the drum along substantially its entire length and maintain the preform frozen.

14. The apparatus claimed in claim 13 wherein the refrigerating means includes:
    (a) an annular chamber between the drum and the housing; and
    (b) means for circulating a refrigerant through the chamber.

15. The apparatus claimed in claim 14 wherein:
    the cutting disc is disposed at a slight angle to the normal through the longitudinal axis of the drum's interior and tilted towards the interior of the drum; and
    the drum includes a plurality of spaced-apart, longitudinal ribs formed in the wall of the drum and extending into the drum's interior for holding the preform for rotation with the drum.

16. The apparatus claimed in claim 15 wherein:
    (a) the preform support includes (i) a preform cradle for supporting the preform in line with the drum's interior prior to its insertion into the drum's interior; and (ii) a cradle retracting assembly on the base operable to retract the cradle from its preform support position laterally away from the drum;

(b) the base includes at least one guide parallel to the longitudinal axis of the drum; and (c) the ram includes:

(i) a carriage mounted for translation on the guide;

(ii) a shaft on the carriage coaxial with the longitudinal axis of the drum's interior; and (iii) a head rotatably engaged on the shaft having a surface approximately normal to the longitudinal axis of the drum's interior and facing such interior, the ram being positioned and operable to translate on the guide towards the drum, engage the preform on the cradle with the head, insert the preform in the drum's interior with the head and advance the preform through the drum's interior.

17. The apparatus claimed in claim 16 including means for varying the rate of ram advance with respect to drum rotation.

References Cited

UNITED STATES PATENTS 1,881,171 10/1932 Cooley.
2,122,947 7/1938 Lopez _____ 146—167 X W. GRAYDON ABERCROMBIE, Primary Examiner U.S. Cl. X.R.

146—95